United States Patent [19]
Karsh et al.

[11] Patent Number: 4,641,324
[45] Date of Patent: Feb. 3, 1987

[54] SIGNAL CORRECTION APPARATUS

[75] Inventors: Herbert Karsh, Laguna Beach; Ward M. Calaway, Sierra Madre, both of Calif.

[73] Assignee: Eastman Kodak Company, Rochester, N.Y.

[21] Appl. No.: 650,596

[22] Filed: Sep. 14, 1984

[51] Int. Cl.$^4$ .......................................... H04L 25/06
[52] U.S. Cl. ...................................... 375/76; 375/110; 307/353; 307/358; 328/151
[58] Field of Search ................... 375/76, 110; 328/151; 307/264, 353, 358, 359; 358/171, 282

[56] References Cited

U.S. PATENT DOCUMENTS

| | | | |
|---|---|---|---|
| 4,375,099 | 2/1983 | Waters et al. | 307/358 |
| 4,387,465 | 6/1983 | Becker | 375/76 |
| 4,406,988 | 9/1983 | Scholz | 307/358 |

OTHER PUBLICATIONS

Sample-and-Hold Switching Treshold Generator Using AC-Coupled Resistive Divider—G. T. Davis, IBM Tech. Disclosure Bulletin, vol. 21, No. 1, Jun. 1978, pp. 29-30.

Primary Examiner—Robert L. Griffin
Assistant Examiner—M. Huseman
Attorney, Agent, or Firm—Robert F. Cody

[57] ABSTRACT

A closed loop circuit corrects digital data baseline shift resulting from perturbing interferences. Samples of the signal amplitude are stored at each clock time; and a correction signal is derived from the stored information. The correction signal is subtracted from the data signal to produce a resultant signal that is devoid of baseline shift, such resultant signal being also used to control clock regeneration in a phase locked loop.

14 Claims, 13 Drawing Figures

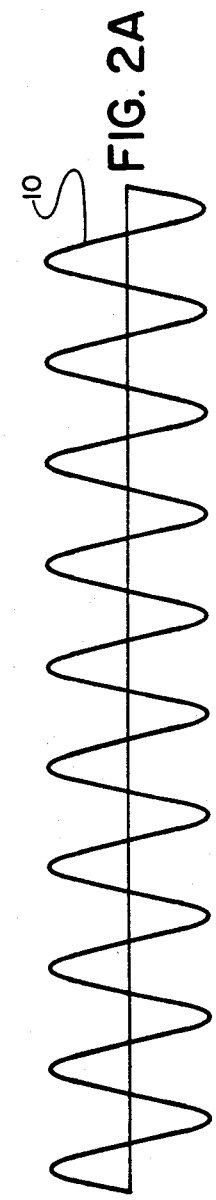

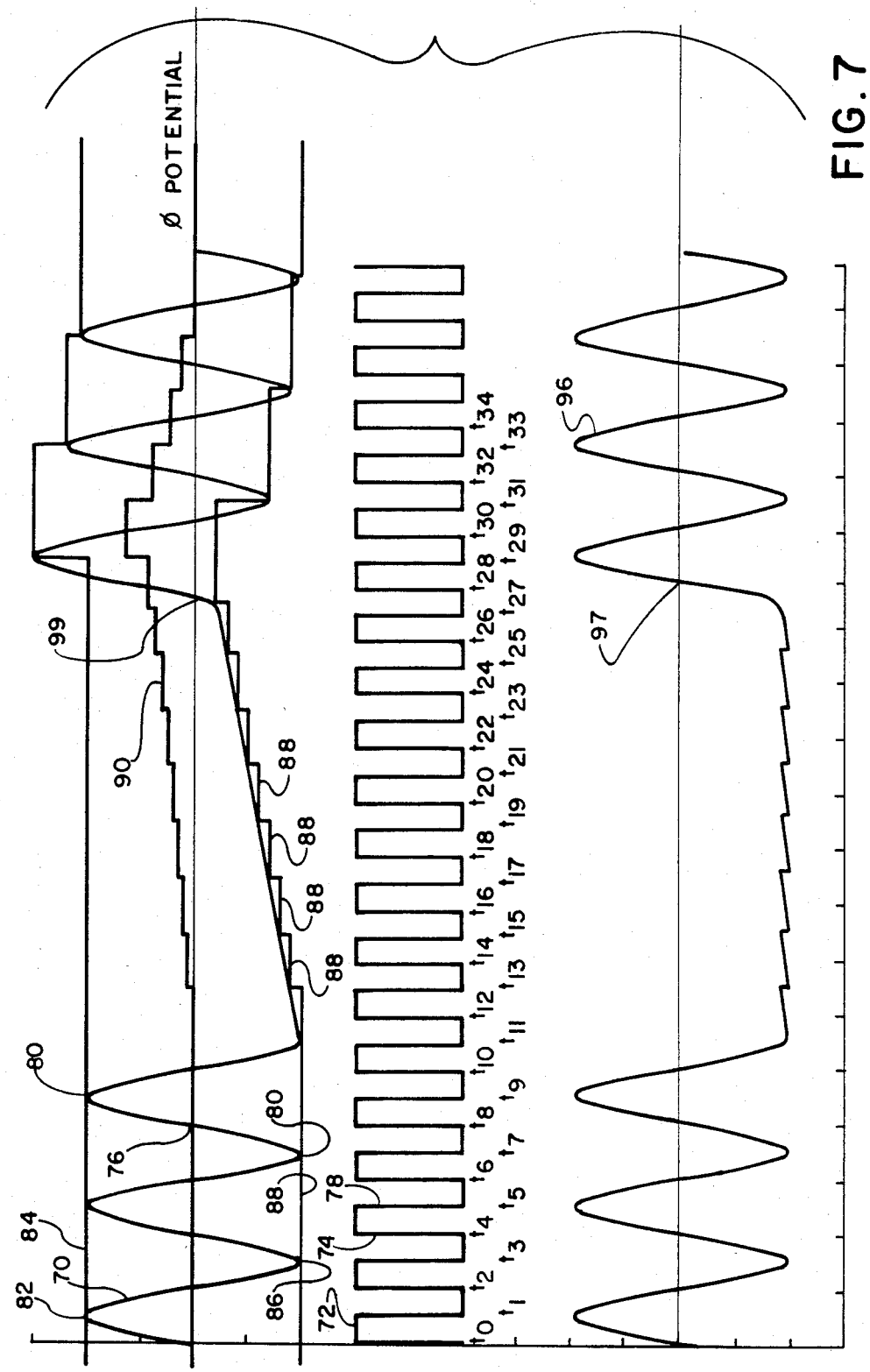

SIGNAL CORRECTION APPARATUS

BACKGROUND OF THE INVENTION

1. Field of the Invention

This invention relates to correction of baseline shift of a pulsed digital signal waveform and, in particular, to correction of baseline shift introduced by additive noise, multiplicative noise and lack of circuit low frequency response.

The nature of the baseline shift problem, the prior art approach to solution of some aspects of the problem, and the solution encompassed by the present invention may be understood by reference to the drawings, wherein: FIGS. 1, 2A, 2B, 2C, 4, 5A, 5B, 5C illustrate waveforms related to the baseline shift problem for which the invention provides a solution.

FIG. 7 illustrates waveforms useful in understanding the embodiments depicted in FIG. 6.

2. Description Relative to the Prior Art

Figure 1:
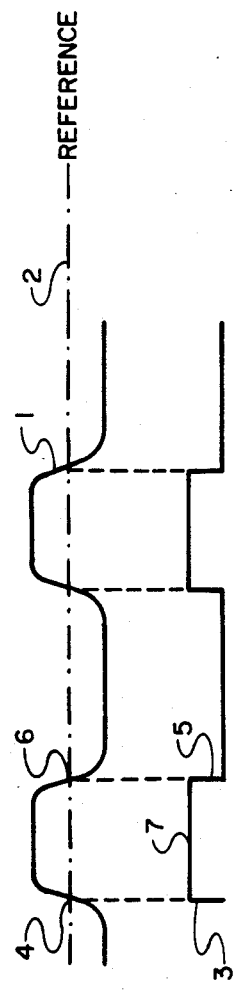

The reshaping of a pulsed digital signal which has been degraded during a signal processing operation is a common circuit problem. For example, since circuit elements have distributed capacitance which limits circuit bandwidth, the sharply rising leading edge and the sharply falling trailing edge of a pulsed digital signal become sloped when the signal is processed by a circuit. In reshaping the degraded signal, the beginning and end of the signal are arbitrarily defined. The usual reshaping technique compares the signal amplitude against a reference level, and generates a fast rising leading edge when the degraded "signal rise" crosses the reference level, and generates a fast falling trailing edge when the degraded "signal fall" crosses the reference level. While the value of the selected reference level depends upon the system biasing arrangement, the 0 volt level is a common choice. "Zero Crossing" is a term of art applied when the reference level is 0 volts. FIG. 1 illustrates a typical pulsed digital signal waveform 1, and a reference level 2. Any of a variety of comparison circuits known in the prior art may be used to sense the coincidence of a rise point 4 and a reference level 2. The comparison circuit generates a fast rising signal edge 3 at the time of coincidence, maintains a constant fixed output pulse amplitude 7 until the degraded signal drops below the reference level 2, and then generates a fast falling signal edge 5. This technique reshapes and recovers the original pulsed digital signal waveform after a processing operation has distorted the pulsed signal characteristics. When an extraneous signal, such as additive noise, interferes with the signal reshaping process, the pulsed signal waveform zero crossing points vary, and the start and end times of the reshaped signal differ from their true "unperturbed" values. This means, in effect, that the reshaped signal has been either narrowed or widened, its time of occurrence being either early or late relative to an unperturbed signal. Such pulse displacements appear as timing errors, and detrimentally affect digital circuit and system operation.

Low frequency radiated interference, generated by power transformers or similar sources and picked up in the signal circuit, is an example of typical additive noise.

Figure 2C:
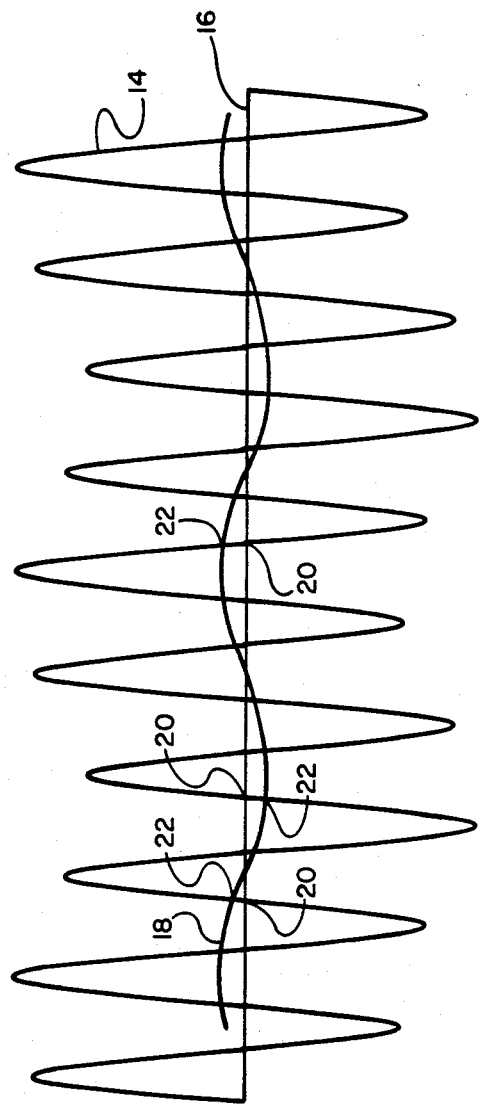

For a more detailed discussion regarding additive noise, reference should now be had to FIGS. 2A, 2B and 2C: FIG. 2A represents a degraded pulsed digital signal 10 to be reshaped; FIG. 2B depicts an interfering noise signal 12 which adds to the signal 10 to form a resultant signal 14: and FIG. 2C illustrates the sum of signals 10 and 12, and also depicts a zero reference level 16. The mean value of the resultant signal 14, averaged over one period of the data signal 10, is represented by waveform 18. The noise signal 12 varies the total signal amplitude relative to the fixed reference level 16; and the mean signal level 18 varies in the same manner. If the interfering noise signal were not present, the mean signal level 18 would coincide with the reference level 16 and the situation as depicted in FIG. 1 would obtain. Because of the signal interference, however, the resultant signal 14 coincides with the reference level at point 20 rather than at point 22, which is the "interference-free" coincidence point. This same disturbing effect occurs at every zero crossing point and results in random timing errors in the recovery of the data signal.

Figure 3:
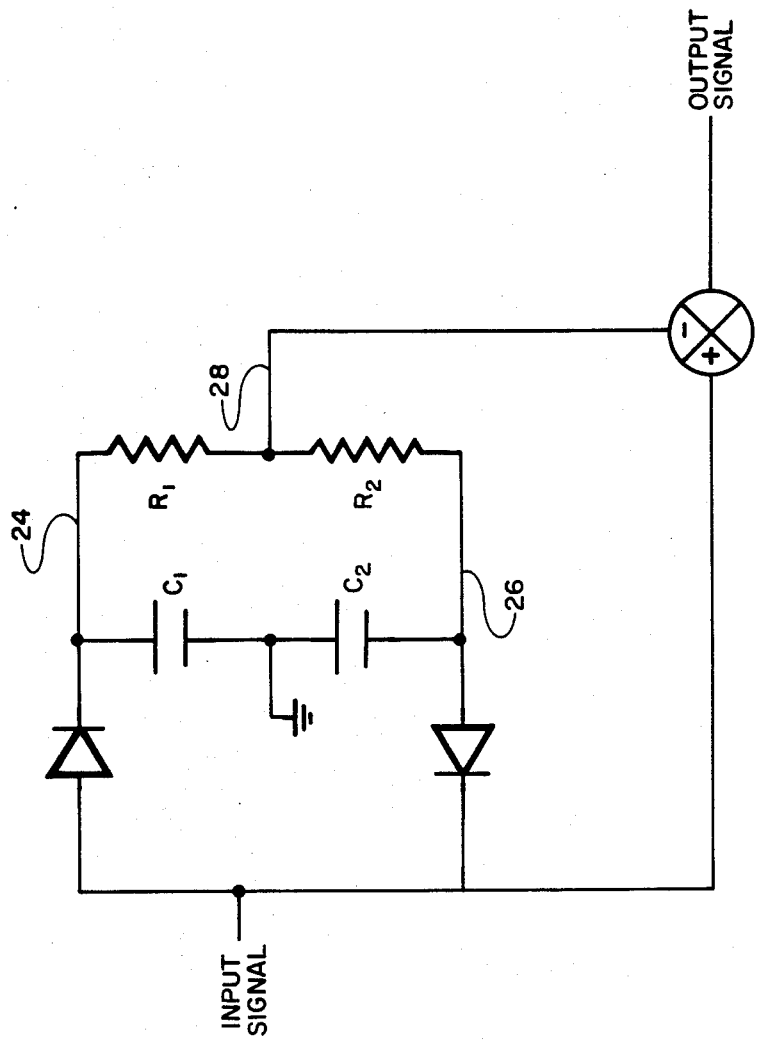
FIG. 3 depicts a prior art circuit over which the invention provides improvement.

FIG. 3 illustrates a circuit employed in the prior art to improve zero crossing accuracy: Positive (24) and negative (26) peak detectors are charged (C1, C2) to maximum and minimum peak excursions of the degraded pulse signal waveform. Adder network R1, R2 provides a signal at 28 which is proportional to the mean value of the excursion peaks. The mean value approximates the variation in the signal baseline and, when it is subtracted from the input signal, the uncertainty of the resultant signal's zero crossings are minimized.

Figure 4:
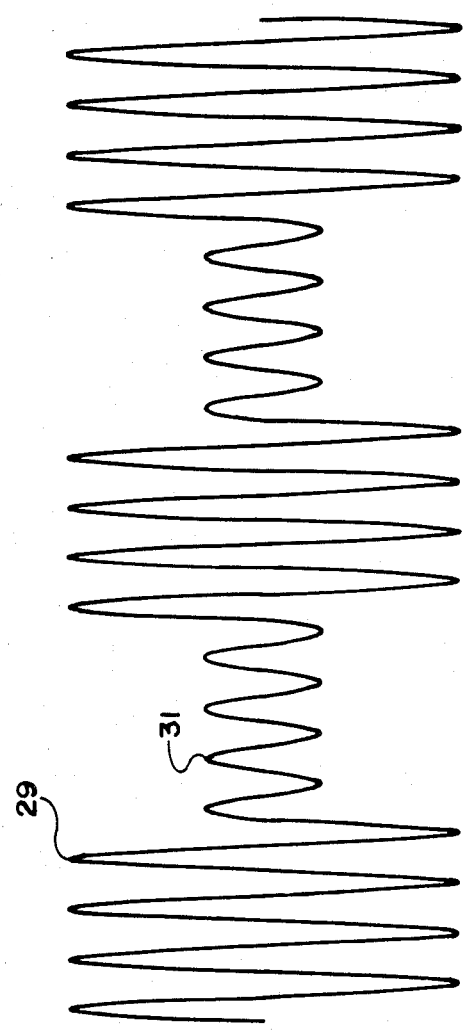

The time constant values, R1, C1, and R2, C2, establish the averaging action of the FIG. 3 circuit. The averaging technique consists of filtering the composite waveform, wherein the higher frequency data signal 14 is bypassed to ground by means of capacitors C1 and C2, and the lower frequency interfering signal 12 appears as the input to the adder network R1 and R2. This correction technique has limited applicability: The fixed time constants restrict use of the circuit to correction of interfering signals of frequencies less than, say, 0.1 times the data signal rate. The fixed time constants also limit circuit response to abrupt changes in signal level which can occur, for example, due to transmission fading or from head/tape spacing variations in a magnetic recording system. Amplitude variations such as these are termed in the art "multiplicative noise" (as opposed to "additive noise") and FIG. 4 illustrates a signal waveform subjected to such multiplicative noise. When the signal level abruptly decreases from amplitude 29 to amplitude 31 in FIG. 4, the peak detectors 24, 26 of the Figure circuit 3 cut off and no longer follow the signal variations, and correction fails. The present invention, as will appear below, is not limited by either fixed circuit time constants or multiplicative noise effects.

Figure 5:
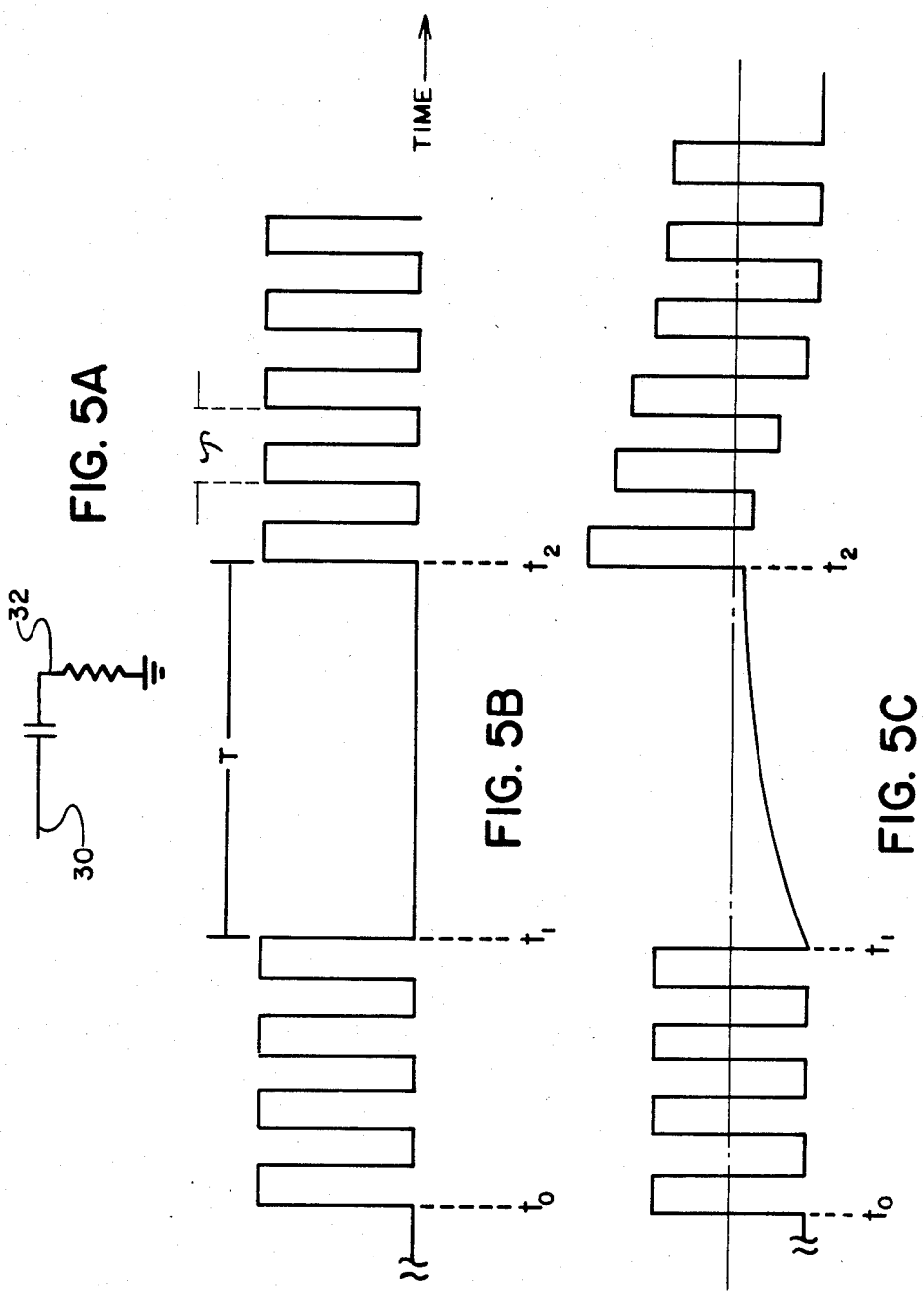

Baseline shift problems also arise in relation to coded digital signals which have d.c. components, e.g. in the reshaping of such signals aftr processing through a radio link or magnetic tape system having poor low frequency response. The origin of such baseline shift may be understood in reference to FIG. 5 (A, B, C). FIG. 5A depicts a simple illustrative circuit having no d.c. response. FIG. 5B depicts a pulse waveform applied to the input 30 of the FIG. 5A circuit. The time constant RC of the FIG. 5A circuit is greater than time τ and less than time T of FIG. 5B. The output waveform at 32 of the FIG. 5A circuit is shown in FIG. 5C. (To be noted is that FIG. 5C assumes that any circuit transient has subsided before time $t_o$). Since the capacitor of the FIG. 5A circuit cannot transmit d.c., the capacitor becomes so charged that the output waveform has no d.c. component. When the input becomes quiescent at time $t_1$, the capacitor starts to discharge and the output (FIG. 5C) moves towards 0 volts. At time $t_2$, when the input signal again rises (FIG. 5B), the voltage of the FIG. 5C output rises above 0 volts; then as the input waveform continues to vary, the capacitor again accumulates charge and, as this occurs, the output waveform decays toward its equilibrium position around 0 volts. The baseline, therefore, varies in a manner depending upon the exact pattern of the input waveform.

Baseline shift is particularly troublesome in non-return-to-zero (NRZ) coding systems which, as is known, usually recover data clocks from the data stream itself. (Clock recovery is accomplished by means of a phase locked loop which is synchronized to incoming data, and in response thereto regenerates the clock. A phase locked loop generally relies on the zero crossings of a data stream to provide the phase information used in synchronizing its loop. Baseline variations in the data will not only affect the recovery of the data stream, but will also cause zero crossing variations resulting in timing jitter of the regenerated clock.)

SUMMARY OF THE INVENTION

In accordance with the invention, a clock recoverable data stream is sampled by a locally generated clocking source, and the sampled amplitude values are stored. The sampling times are forced by servo action to coincide with the occurrence of the positive and negative data signal peak excursions. Given this sample timing, the positive and negative stored samples reflect the data stream amplitude variations regardless of the cause of the variation. The mean value calculated from positive and negative stored samples tracks the variation in baseline position and, after scaling, is an error correction signal. The correction signal is subtracted from the incoming data waveform, yielding the corrected output signal.

The corrected signal is also the input signal to a phase locked loop which generates a locally derived clock. The phase locked loop synchronizes on signal zero crossings and, since it is fed from the baseline corrected data waveform, it provides the means for reducing jitter in the reconstructed clock . . . which is the source proper of the sampling pulses.

Unlike the prior art wherein the mean signal values are obtained by filtering, with the attendant problems previously described, the invention corrects baseline shift on a clock pulse-by-clock pulse basis. The correction is performed in the presence of additive noise, multiplicative noise and system lack of low frequency response. Additionally, correction due to interfering signals of frequencies up to the data repetition rate itself is accomplished by means of the invention.

DETAILED DESCRIPTION

Figure 6:
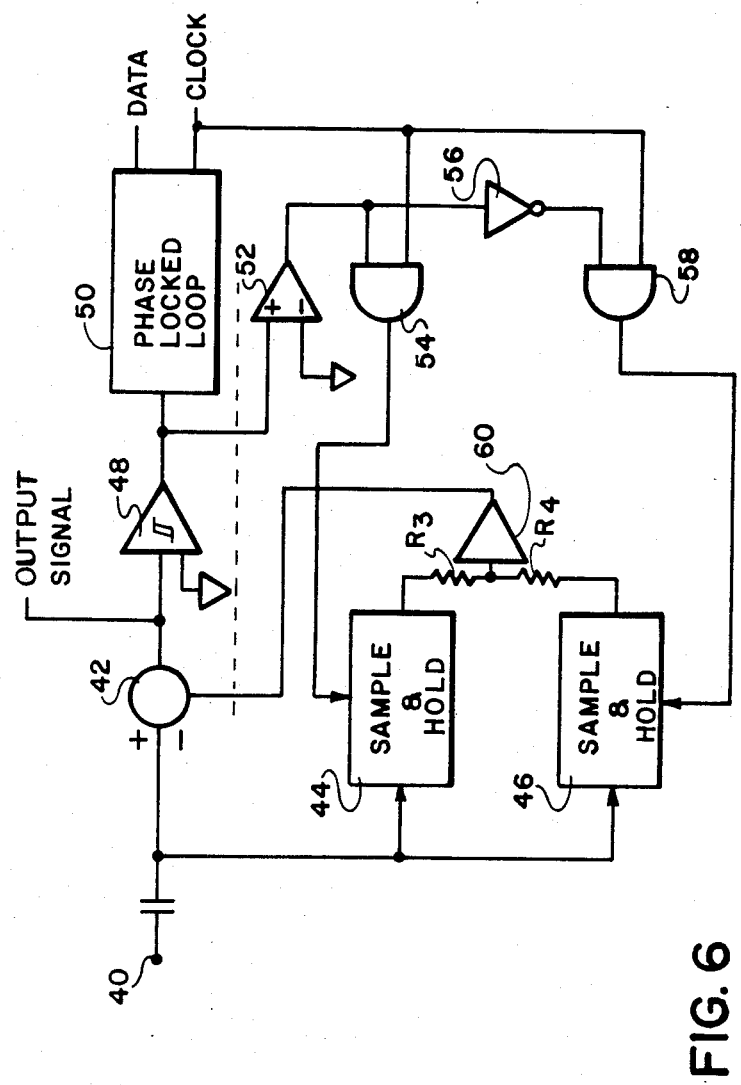
FIG. 6 is a block diagram of apparatus embodying the invention.

Operation of the invention may be understood by reference to the circuit of FIG. 6: An input waveform to be reshaped is applied at 40 and is fed to one input of a subtraction circuit 42 and to the inputs of sample and hold circuits, 44 and 46. The output of the subtraction circuit is fed to a comparator 48 which is referenced to 0 volts. When the input data signal is positive with respect to 0 volts, the output of the comparator 48 is positive; and when the input data signal is negative, the comparator output is negative. The comparator output signal, which has the same zero crossing as the system output signal, is applied to a phase locked loop 50, and to a driver amplifier 52, whose output feeds an AND gate 54 and an inverting amplifier 56. The output of the amplifier 56 feeds one input of an AND gate 58. The other inputs to the AND gates 54 and 58 receive locally generated clock pulses from the phase locked loop 50. When the input signal at 40 is positive, the output of the amplifier 52 is positive, and positive clock pulses will be transmitted by the AND gate 54 to the sampling input of the sample and hold circuit 44. Since the amplifier 56 is an inverting amplifier, no clock sampling pulses are transmitted in this instance through the AND gate 58. When the input signal at 40 is negative, however, the conditions at the gates 54 and 58 reverse, causing the AND gate 58 to feed clock sampling pulses to the sampling input of the sample and hold circuit 46. Such action on the part of the AND gates 54, 58 constitutes selection of the positive and negative segments of the input signal at 40. Thus, as will be appreciated, the circuit 44 samples and holds the positive values of the input (40) signal and the circuit 46 samples and holds the negative values of such signal at appropriate clock times. These sampled voltages are respectively applied across equal resistors R3 and R4, arranged in an adder network; and the voltage at the junction of resistors R3 and R4 is applied, via a scaling amplifier 60, to the negative input of the subtraction circuit 42.

The signal at the junction of the resistors R3 and R4 is the mean value of the stored positive and negative signal amplitudes sampled at each clock time. This mean value signal follows the variations in baseline due to noise interference and/or lack of d.c. response. When it is scaled and subtracted (42) from the input signal, the resultant corrected signal is both the output signal and the corrected input to the clock-generating phase locked loop 50. The circuit of FIG. 6, which operates as a closed loop system, updates the correction information at every clock time, and corrects the baseline shift in an instantaneous and continuous manner.

With the operation of the circuit of FIG. 6 in mind, a more complete understanding of the invention may now be had by reference to the waveforms of FIG. 7: The waveform 70 is an uncorrected input pulsed data signal waveform with baseline shift as previously described (FIG. 5C). The signals 72 are clock pulses generated by the phase locked loop 50. The timing of the rising edge 74 of each clock pulse is locked to the zero crossing of the input waveform as, for example, the zero crossing 76. The trailing edge 78 of each clock pulse 72 occurs in the center of the bit cells corresponding to possible positive or negative peaks 80 of the uncorrected input waveform 70, and this trailing edge is used to derive the sampling signal previously described.

At time $t_o$ the input signal waveform 70 starts to go positive. When a sample pulse occurs at time $t_1$ the positive peak 82 of the input signal waveform is sampled and held, thereby generating waveform 84. At time $t_2$ the input signal starts to go negative and, at sample time $t_3$, the signal peak 86 is sampled and held, generating waveform 88. In the illustrated example, the next occurring peaks have the same amplitudes as the peaks 82 and 86 and, after sampling at times $t_5$, $t_7$, $t_9$ and $t_{11}$, the amplitudes of the "held" waveforms retain their previous values. After time $t_{11}$, the input signal waveform has become quiescent, and the uncorrected signal starts to climb toward 0 volts, as previously described. At time $t_{13}$, the input signal waveform 70 is still negative but rising . . . and waveform 88 changes in response to the sampling of the uncorrected input signal 70. As the signal 70 continues to rise, its sampled values continue to increase as well.

During these sampling times, the waveform 84 has remained at its last sampled value. At time $t_{29}$, however, the input waveform 70 is again positive, the waveform 84 thereafter being updated, while the waveform 88 retains its last sampled value. The mean value signal computed from waveforms 84 and 88, as previously described, is shown as waveform 90. As the negative input signal waveform rises toward 0 volts, the waveform 88 is incremented toward 0 volts also. At time $t_{31}$, the average of the input signal 70 begins to decrease, and the computed mean value waveform 90 also begins to decrease. The waveform 90 is scaled by means of the amplifier 60 (FIG. 6), and is the correction signal to be subtracted from the input signal waveform 70. When subtracted, the resultant signal is the corrected signal 96. By comparing the zero crossing time after correction 97 (FIG. 7) to that before correction 99, the improvement produced by means of invention is demonstrated.

Figure 8A:
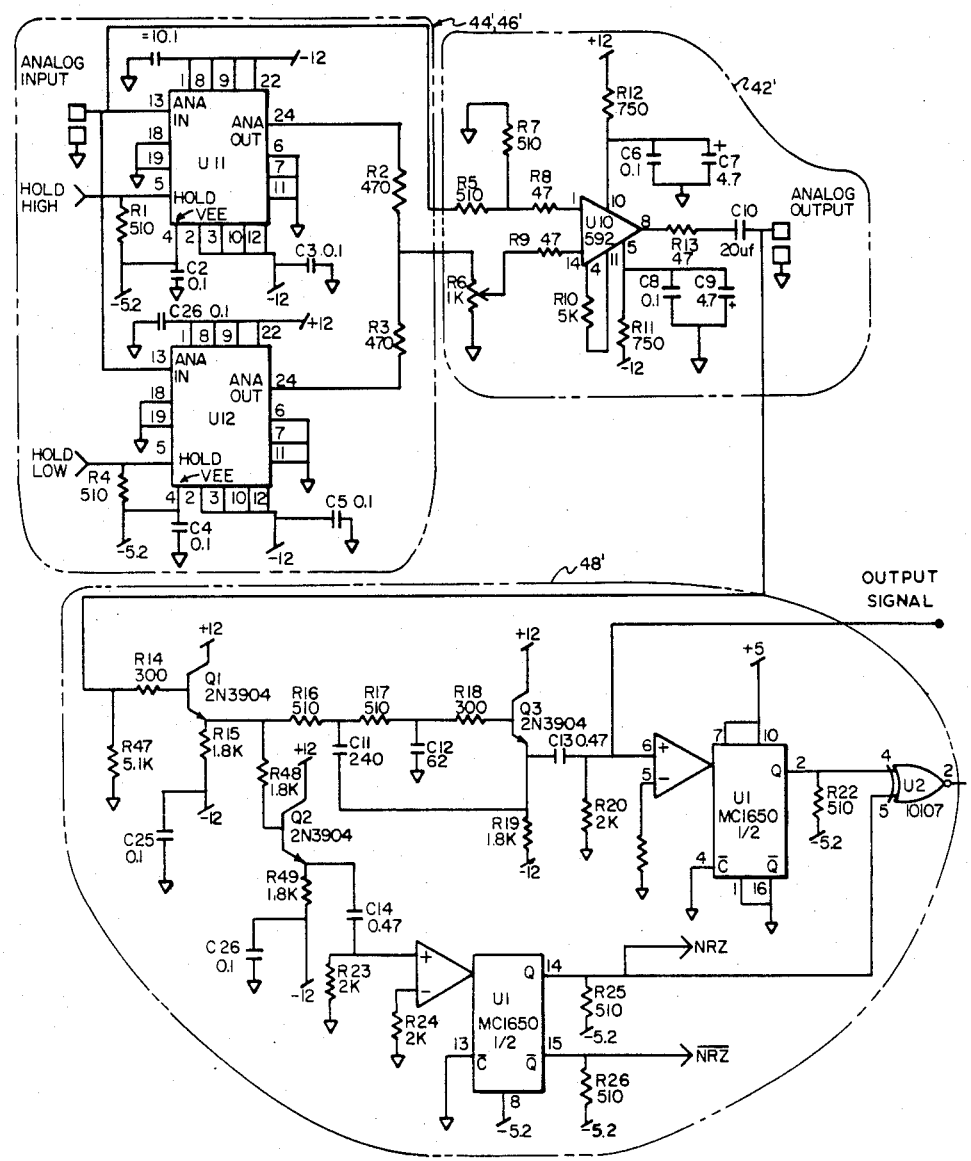
FIGS. 8a and 8b shows a circuit diagram of apparatus embodying the invention.
Figure 8B:
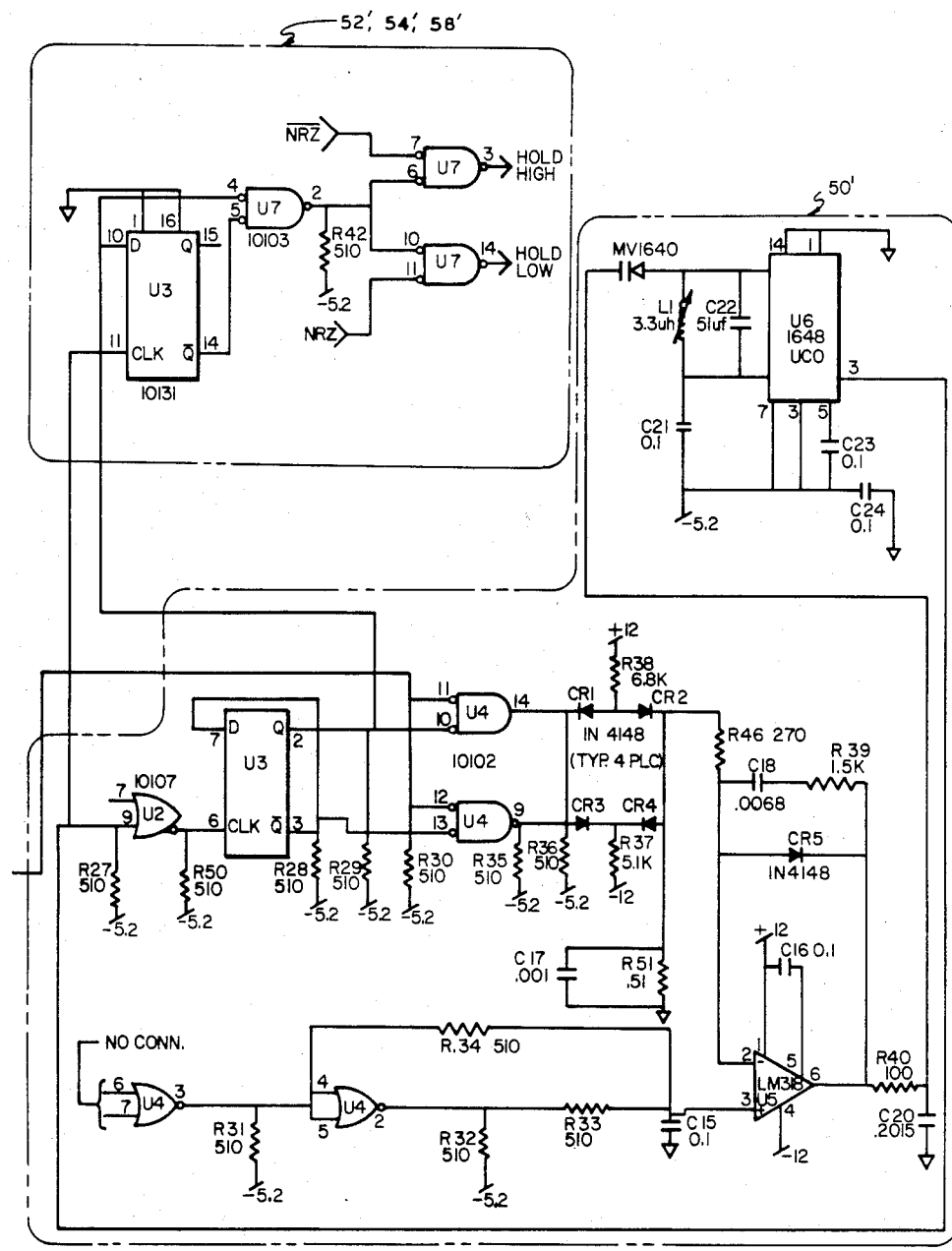

In the interest of providing a full and complete disclosure of apparatus according to the invention, an actual circuit (with appropriate component values) is presented in FIG. 8. To facilitate understanding of the operation of the FIG. 8 circuit, the corresponding parts of the FIG. 6 circuit have been appropriately blocked-off and provided with the same character numbers, albeit that such numbers have been primed.

The invention has been described in detail with particular reference to preferred embodiments thereof, but it will be understood that variations and modifications can be affected within the spirit and scope of the invention. For example, in a non-clock recoverable coding system, such as used in a magnetic tape system with a separate clock track, or in a radio transmission system utilizing a separate clock subcarrier, the teaching of the invention may be applied to reconstructing the clock. Using the reconstructed clock for sampling, the data channels may then be corrected by following the teaching of the invention.

What is claimed is:

1. Apparatus for correcting baseline variation of a continuous or discontinuous periodic electrical waveform, said apparatus comprising:
   (a) means for the periodic sampling of the amplitude of said waveform to produce a series of signal samples,
   (b) means for receiving and storing said signal samples,
   (c) means for producing the average of said stored signal samples,
   (d) means for subtracting said average of said stored signal samples from said periodic electrical waveform, thereby to provide correction of any baseline variation which may occur in said periodic electrical waveform, resulting in a baseline corrected periodic electrical waveform, and
   (e) means for synchronously locking said periodic sampling means to said baseline corrected waveform, whereby said periodic samples occur at the nominal times of the peaks of said periodic electrical waveform,
said synchronous locking means being a phase locked loop circuit.

2. Apparatus for effecting a baseline corrected self clocking NRZ digital waveform from a self clocking NRZ digital waveform subject to baseline variation said apparatus comprising:
   (a) means for producing clocking signals from said baseline corrected self clocking NRZ digital waveform,
   (b) means for periodically sampling the amplitude of said self clocking NRZ digital waveform subject to baseline variation in response to said clocking signals,
   (c) means for storing said amplitude samples,
   (d) means for producing an average of said stored amplitude samples,
   (e) means for subtracting said average of said amplitude samples from said self clocking NRZ digital waveform subject to baseline variation, and
   (f) means for synchronously locking said means for producing said clocking signals to said corrected self clocking NRZ digital waveform in response to the output of said subtracting means,
said sampling means being means for sampling at the nominal peaks of said NRZ digital waveform, and said synchronous locking means being a phase locked loop circuit.

3. Method for correcting baseline variation of a continuous or discontinuous periodic electrical waveform, said method comprising the steps of:
   (a) periodically sampling the amplitude of said waveform,
   (b) storing the samples so produced,
   (c) producing an average amplitude signal from said stored amplitude samples, and
   (d) subtracting said average amplitude signal from said periodic electrical waveform, whereby said subtraction provides correction of baseline variation of said periodic electrical waveform, and
wherein said sampling is operative at the nominal occurrence times of the peaks of said periodic electrical waveform, and said sampling is synchronously locked to said corrected periodic electrical waveform, and
   said synchronous locking is performed by a phase locked loop circuit.

4. A method for recovering a baseline corrected self clocking NRZ digital waveform from a self clocking NRZ digital waveform subject to baseline variation, said method comprising the steps of:
   (a) recovering the clocking signal from said baseline corrected self clocking NRZ digital waveform,
   (b) periodically sampling the amplitude of said self clocking NRZ digital waveform,
   (c) storing said sampled amplitude values,
   (d) computing the average of said stored amplitude values,
   (e) subtracting said average from said self clocking NRZ digital waveform to provide a baseline corrected NRZ digital waveform,
said sampling being synchronously locked for occurrence at the nominal times of occurrence of said NRZ digital waveform peaks, and said synchronous locking being synchronized to said baseline corrected NRZ digital waveform.

5. Apparatus for correcting baseline variation of a bipolar periodic input signal to provide a baseline corrected bipolar periodic output signal, such apparatus comprising:
  (a) timing pulse generating means for providing essentially uniformly occurring timed pulses,
  (b) means for synchronously locking said timing pulse generating means to the periodicity of said baseline corrected bipolar periodic output signal,
  (c) means to select the positive amplitude segments of said input signal,
  (d) means to select the negative amplitude segments of said input signal,
  (e) sampling means cooperating with said timing pulse generating means for synchronously sampling said positive amplitude segments to provide resultant positive amplitude samples,
  (f) sampling means cooperating with said timing pulse generating means for synchronously sampling said negative amplitude segments to provide resultant negative amplitude samples,
  (g) first storage means for sequentially receiving and storing without time averaging said resultant positive amplitude samples,
  (h) second storage means for sequentially receiving and storing without time averaging said resultant negative amplitude samples,
  (i) means for combining the output of said first storage means and the output of said second storage means to provide the instantaneous amplitude average of said stored resultant positive and resultant negative amplitude samples, and
  (j) means for subtracting said instantaneous amplitude average from said bipolar periodic input signal to provide said baseline corrected bipolar periodic output signal.

6. The apparatus of claim 5 wherein said bipolar input signal is a clock recoverable digital signal.

7. The apparatus of claim 6 wherein said clock recoverable digital signal is an NRZ signal.

8. Method for removing baseline shift of a bipolar periodic input signal to provide a baseline corrected bipolar periodic output signal, said method comprising the steps of:
  (a) generating timing signals of essentially uniformly timed pulses,
  (b) synchronously locking said timing signals to the periodicity of said baseline corrected bipolar periodic output signals,
  (c) selecting the positive and negative amplitude segments of said input signal,
  (d) sampling said positive and negative amplitude segments in cooperation with said timing signals to provide positive and negative amplitude samples,
  (e) storing without time averaging said positive amplitude samples,
  (f) storing without time averaging said negative amplitude samples,
  (g) adding said stored positive amplitude samples to said stored negative amplitude samples to provide the instantaneous amplitude average of said stored samples, and
  (h) subtracting said instantaneous amplitude average from said bipolar periodic input signal to provide said baseline corrected bipolar periodic output signal.

9. The method of claim 8 wherein said bipolar input signal is a clock recoverable digital signal.

10. The method of claim 9 wherein said clock recoverable digital signal is an NRZ signal.

11. Apparatus for the improvement of the timing accuracy of substantially uniformly occurring clocking signals derived from a bipolar clock recoverable input signal subject to baseline shift, such apparatus comprising:
  (a) means for the determination of the instantaneous amount of said baseline shift at the times of occurrence of said clocking signals,
  (b) means for subtracting said amount of baseline shift from said bipolar clock recoverable input signal to provide a baseline corrected bipolar clock recoverable output signal, and
  (c) means for deriving said clock signals from said baseline corrected output signal, whereby said improvement of the timing of said clocking signals results from correction of said baseline shift.

12. Apparatus of claim 11 wherein said means for deriving said clock signals from said bipolar baseline corrected output signal is means responsive to the zero crossings of said baseline corrected output signal.

13. Apparatus of claim 12 wherein said bipolar baseline corrected output signal is an NRZ signal.

14. Apparatus of claim 11 wherein said means for the determination of said instantaneous amount of baseline shift comprises:
  (a) means to select the positive amplitude segments of said input signal,
  (b) means to select the negative amplitude segments of said input signal,
  (c) sampling means cooperating with said clock signals for sampling said positive amplitude segments to provide resultant positive amplitude samples,
  (d) sampling means cooperating with said clock signals for sampling said negative amplitude segments to provide resultant negative amplitude samples,
  (e) first storage means for sequentially receiving and storing without time averaging said resultant positive amplitude samples,
  (f) second storage means for sequentially receiving and storing without time averaging said resultant negative amplitude samples,
  (g) means for combining the output of said first storage means and the output of said second storage means to provide the instantaneous amplitude average of said stored amplitude samples, and
  (h) means for subtracting said instantaneous amplitude average from said bipolar periodic input signal to provide said baseline corrected bipolar periodic output signal.

* * * * *